United States Patent
Bashir

(10) Patent No.: US 11,109,235 B2
(45) Date of Patent: Aug. 31, 2021

(54) SPECTRUM MANAGEMENT SERVICE

(71) Applicant: T-Mobile USA, Inc., Bellevue, WA (US)

(72) Inventor: Shahzad Bashir, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/590,350

(22) Filed: May 9, 2017

(65) Prior Publication Data

US 2018/0332582 A1 Nov. 15, 2018

(51) Int. Cl.
| | |
|---|---|
| *H04W 16/14* | (2009.01) |
| *G06F 16/29* | (2019.01) |
| *H04W 24/02* | (2009.01) |
| *H04W 4/021* | (2018.01) |

(52) U.S. Cl.
CPC ............ *H04W 16/14* (2013.01); *G06F 16/29* (2019.01); *H04W 4/021* (2013.01); *H04W 24/02* (2013.01)

(58) Field of Classification Search
CPC ..... H04W 28/20; H04W 16/14; H04W 24/02; H04W 24/10; H04W 72/085; H04W 88/10; H04W 72/0453; H04W 72/046; H04W 16/18; H04W 24/08; G06F 17/30592; G06F 2209/5019; G06F 9/4881; G06F 9/5083; H04L 43/0882; H04L 29/08144; H04L 43/0876
See application file for complete search history.

(56) References Cited

U.S. PATENT DOCUMENTS

| | | | | |
|---|---|---|---|---|
| 2014/0073259 | A1* | 3/2014 | Schmidt ................ | H04W 16/14 455/63.3 |
| 2015/0063152 | A1* | 3/2015 | Chiang .................. | H04L 43/50 370/252 |
| 2015/0223072 | A1* | 8/2015 | Weaver ................. | H04W 76/10 370/330 |
| 2016/0014613 | A1* | 1/2016 | Ponnampalam ...... | H04W 16/18 370/254 |
| 2016/0316422 | A1* | 10/2016 | Regan ................... | H04W 24/02 |
| 2017/0208476 | A1* | 7/2017 | Khambekar .......... | H04W 16/14 |

* cited by examiner

*Primary Examiner* — Yuwen Pan
*Assistant Examiner* — Jing Gao
(74) *Attorney, Agent, or Firm* — Knobbe Martens Olson & Bear LLP

(57) ABSTRACT

Systems, methods, and computer-readable media are described for a spectrum management service. A spectrum management service may be utilized to manage wireless spectrum licenses, which may associated with various license-holders, spectrum bands, and geographic regions. The spectrum management service may determine a utilization of various spectrum licenses based on capacity data and usage data from a wireless service provider, and may identify underutilized licenses and/or regions within a wireless network where additional spectrum may be required. The spectrum management service may further identify candidates for spectrum license swaps, analyze proposed or actual license swaps, identify transmissions outside of licensed areas, and analyze information from various sources to improve the efficiency of licensed spectrum usage.

15 Claims, 9 Drawing Sheets

SPECTRUM MANAGEMENT SERVICE

BACKGROUND

Generally described, computing devices can be used to exchange information via a network. Mobile computing devices may utilize a network provided by a wireless service provider to facilitate the exchange of information in accordance with one or more wireless communication protocols. For example, a wireless service provider may maintain a wireless network that enables mobile computing devices to exchange information in accordance with a wireless telecommunications protocol. The wireless network may use portions of the radio frequency spectrum to transmit and receive information, and the wireless service provider may be licensed (e.g., by a government agency) to utilize various radio frequencies in the geographic areas where the provider operates.

Wireless service providers may thus obtain spectrum licenses, and may use the licensed spectrum bands to provide wireless telecommunications services. The licensed bands may vary with regard to frequency, penetration (e.g., the ability of the radio signal to pass through various materials), bandwidth, and other characteristics, and different bands may be required to meet wireless communications needs in a given geographic area.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
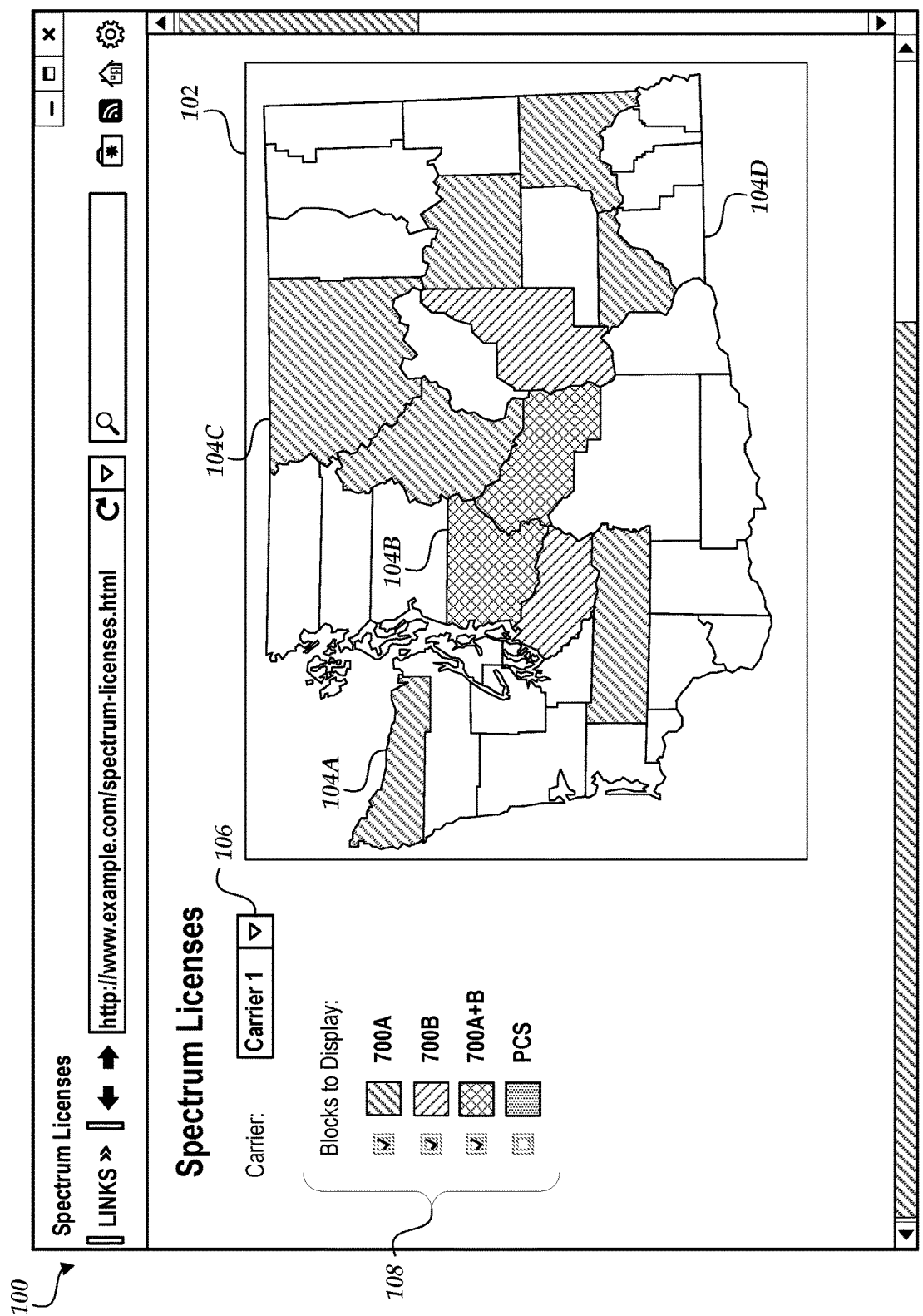
FIGS. 1A-1F are pictorial diagrams of illustrative user interfaces generated by a spectrum management service in accordance with aspects of the present disclosure.

Generally described, aspects of the present disclosure relate to wireless telecommunications. More specifically, aspects of the present disclosure relate to a spectrum management service. Illustratively, a spectrum management service may obtain information regarding operation of wireless services in various geographic regions, such as spectrum licenses held by a wireless service provider. Spectrum license information can include information regarding operation of wireless services in particular geographic regions using a particular band or bands of radio frequencies. For example, a spectrum license may indicate that the wireless service provider is licensed to implement wireless communications by configuring infrastructure equipment and mobile devices to utilize radio frequencies between 698-704 MHz and 728-734 MHz (the "Lower 700 MHz A Block") in a region designated as Basic Economic Area ("BEA") 170. Ranges of authorized radio frequencies can be generally referred to as "blocks," "bands," or "spectrum," and these terms may be used interchangeably herein to refer to the radio frequencies, the license to utilize them, or both.

In one aspect, service providers can consider the potential impact of operating radio frequencies to the operation of a wireless communication network. For example, wireless communications via lower radio frequencies can be more effective at penetrating buildings and other solid objects and may facilitate transmission of wireless communications over longer distances. Wireless communications via higher radio frequencies in turn may facilitate higher bandwidth data communications for, e.g., high-speed data services.

In another aspect, wireless service providers may seek to acquire licenses to contiguous radio frequency blocks. For example, a service provider may wish to operate radio communications in a region with contiguous blocks to enable delivery of higher-bandwidth services. The resulting set of contiguous blocks can be considered as a single large block of radio frequencies.

Wireless service providers may find it difficult to determine whether licensed spectrum is being used efficiently. For example, a wireless service provider's spectrum needs may depend on factors such as the capacity and utilization of the provider's wireless network, the population covered by a spectrum license, the number of actual subscribers covered by the spectrum license, and other factors. To facilitate wireless spectrum planning, wireless service providers may collect data regarding subscriber usage. Based on such usage data, wireless service providers can then make assessments regarding assigned wireless spectrum or performance of at least a portion of a wireless network based on wireless spectrum. However, in many scenarios, the collected data is not sufficiently dispositive to facilitate network planning without further analysis or consideration of additional collected data. For example, the collected data may not indicate whether a capacity issue is due to insufficient network resources (e.g., not having enough cell sites to cover a particular area, or not having enough radios at particular cell sites) or due to a shortage of licensed spectrum for particular regions and/or frequencies. In another example, wireless networks may include cell sites whose radio transmissions on a particular frequency band propagate beyond the boundary of the geographic region in which the provider is licensed to use that band, or cell sites whose radio transceivers have been incorrectly configured and are transmitting on an unlicensed band. The additional collected data is often in a number of mutually incompatible formats, which prevents direct comparisons and does not facilitate consideration or comparison of the various types of data.

Accordingly, to solve the aforementioned technical problems, a wireless service provider may implement a spectrum management service as described herein. Illustratively, a spectrum management service may collect wireless network capacity data and utilization data from a wireless network operated by a wireless service provider. The wireless network capacity data may include, for example, information regarding the available capacity of individual cell sites, or of sectors of cell sites, to transmit and receive in a particular band. The capacity of a cell or sector may be expressed in terms of bandwidth, a number of channels, an amount of available resources, a number of subscribers that can be simultaneously served by the available resources, or other such metrics. The wireless network utilization data may indicate whether and how the available resources of a cell or sector are being utilized. Utilization data may be expressed, for example, as a percentage of available resources, or in terms of bandwidth, number of channels, etc., as described above. Utilization data may indicate a peak utilization, an average utilization, an average utilization during a peak time period (e.g., a "busy hour"), or other measures.

The spectrum management service may further collect and maintain information regarding spectrum licenses. The spectrum licenses may be owned by the wireless service provider, other wireless service providers, or other entities. Spectrum license information may be obtained from the wireless service provider's own internal records, from publicly available records (e.g., records kept by government agencies or other licensing entities), or other sources. Spectrum license information may illustratively include details regarding the portion of the spectrum that is licensed, the licensee, the geographic region(s) covered by the license, and other information.

In some embodiments, the spectrum management service may collect or manage information regarding proposed or scheduled spectrum license purchases, exchanges ("swaps"), auctions, or other events that may lead to changes in spectrum license ownership. In further embodiments, the spectrum management service may identify spectrum license swaps that would be advantageous to the wireless service provider. For example, the spectrum management service may analyze capacity, usage, and spectrum license data to determine that the wireless service provider is underutilizing a block of spectrum in a first region and has a shortage of spectrum in a second region. The spectrum management service may therefore recommend that the wireless service provider pursue a spectrum swap in these areas, or may identify the underutilized spectrum license as a potential swap candidate.

The spectrum management service may further collect information regarding a coverage area of the wireless network. For example, the spectrum management service may collect information that predicts the coverage of individual cell sites based on factors such as cell site antenna characteristics, effective radiated power, terrain features, information received from mobile computing devices, empirical measurements, and other data. The spectrum management service may, in some embodiments, analyze coverage information relative to licensing information to determine areas where a cell site's coverage in a particular spectrum band may exceed the boundaries of the wireless service provider's license. One skilled in the art will understand that different portions of the wireless spectrum will have different characteristics in terms of propagation and coverage footprint, and thus the spectrum management service may perform such analyses on a per-band basis.

The spectrum management service may still further collect information regarding subscribers and populations, and may compare subscriber and/or population data to the licensed regions or coverage boundaries to identify areas with underserved populations or excess capacity. For example, the spectrum management service may determine that a particular region has a relatively large population that is outside the network coverage area, and may thus recommend increasing coverage, capacity, and/or available spectrum in the area. As a further example, the spectrum management service may determine a relative economic value of a spectrum license based on the population in the region covered by the license, the number of subscribers covered, population density, or other factors. Still further, the spectrum management service may identify areas with underutilized capacity and a relatively large pool of potential subscribers, indicating that the wireless service provider has an opportunity to expand its subscriber base and make more efficient use of existing resources.

It will be understood that aspects described herein represent significant technological improvements that enable a computing system to perform tasks not previously performable by a computing system (or, for that matter, by one of skill in the art). It will be further understood that the technical solutions described herein address technical issues that arise in the context of computing networks and wireless telecommunications networks.

FIG. 1A is a pictorial diagram of an illustrative user interface 100 generated by a spectrum management service in accordance with aspects of the present disclosure. The user interface 100 includes a map display 102, which displays geographic regions 104A-D. Illustratively, each of the geographic regions 104A-D may correspond to a spectrum license or licenses. For example, the geographic region 104B may correspond to a first license for the 700 MHz "A" block and a second license for the AWS "B" block.

The user interface 100 further includes a wireless service provider ("carrier") selector 106, which enables selection and display of spectrum licenses owned by a particular wireless service provider (e.g., "Carrier 1"). In some embodiments, the selector 106 may enable selection and display of spectrum licenses that are owned by parties other than a specified carrier (e.g., licenses that are not owned by Carrier 1). The user interface 100 further includes a legend 108, which enables selection of particular blocks of spectrum to display. In various embodiments, the user interface 100 may utilize colors, shading, patterns, or other visual information to identify, for example, geographic regions 104A-D that correspond to multiple spectrum licenses.

In various embodiments, the controls and other elements in the user interface 100 may be combined, separated, or modified. For example, a single user interface element may be provided to enable selection of one or more spectrum blocks, and checkbox elements may be provided to select one or more wireless service providers. As a further example, the map display 102 may include controls that enable zooming, panning, or displaying roads, cities, or other information. Still further, the user interface 100 may include controls that enable overlaying subscriber information, population information, or other data.

Figure 1B:
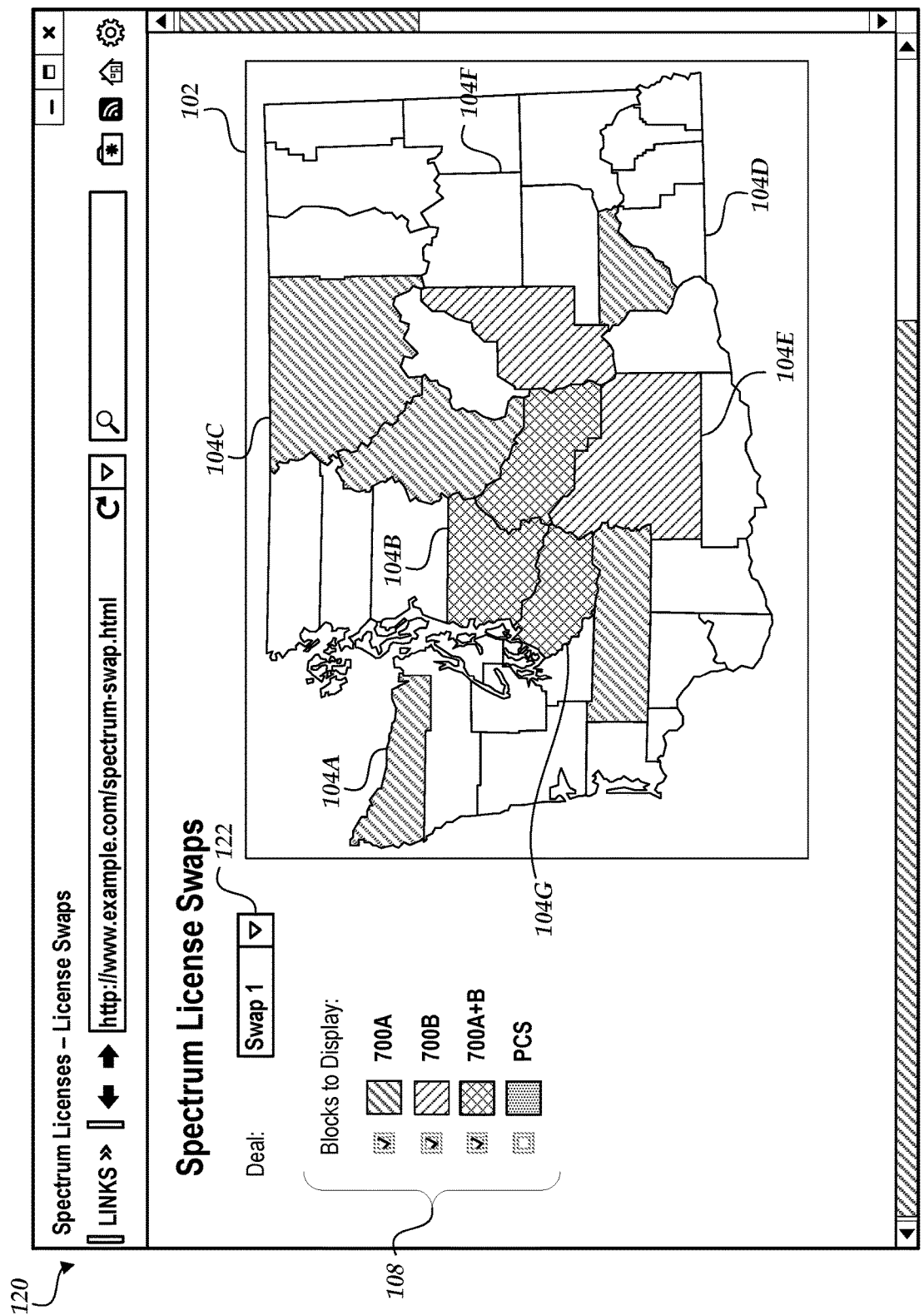

FIG. 1B is a pictorial diagram of an example user interface 120 that illustrates further aspects of the present disclosure. In the user interface 120, the map display 102 indicates that spectrum licenses in geographic regions 104E-G will change hands as the result of a license swap that is scheduled to occur (or, alternately, that the spectrum licenses would change hands if a proposed license swap were to occur). In some embodiments, the map display 102 may display "before" and "after" information regarding a license swap.

The user interface 120 further includes a swap selector 122, which may enable display of one or more license swaps from a database or other collection of license swap information. The user interface 120 may further include a legend 108, as described above with reference to FIG. 1A. In some embodiments, the user interface 120 may include further or additional controls. For example, the user interface 120 may include a date range selector for viewing all spectrum license swaps that are scheduled to occur within a particular timeframe, a selector for viewing licenses acquired from or by a particular carrier, a table displaying information regarding particular geographic regions 104A-G (including, for example, population demographics within a region, network coverage and utilization, and other data), or other controls.

Although described herein as a license "swap," it will be understood that the present disclosure includes any acquisition or transfer of a spectrum license, including but not limited to acquiring a license in a government auction, acquiring a license from another carrier or entity, selling a license, or planning to perform any of these activities. It will further be understood that the spectrum management service may, in some embodiments, display "what if" scenarios or make recommendations based on factors such as network capacity, network utilization, economic value of licenses, or other criteria.

Figure 1C:
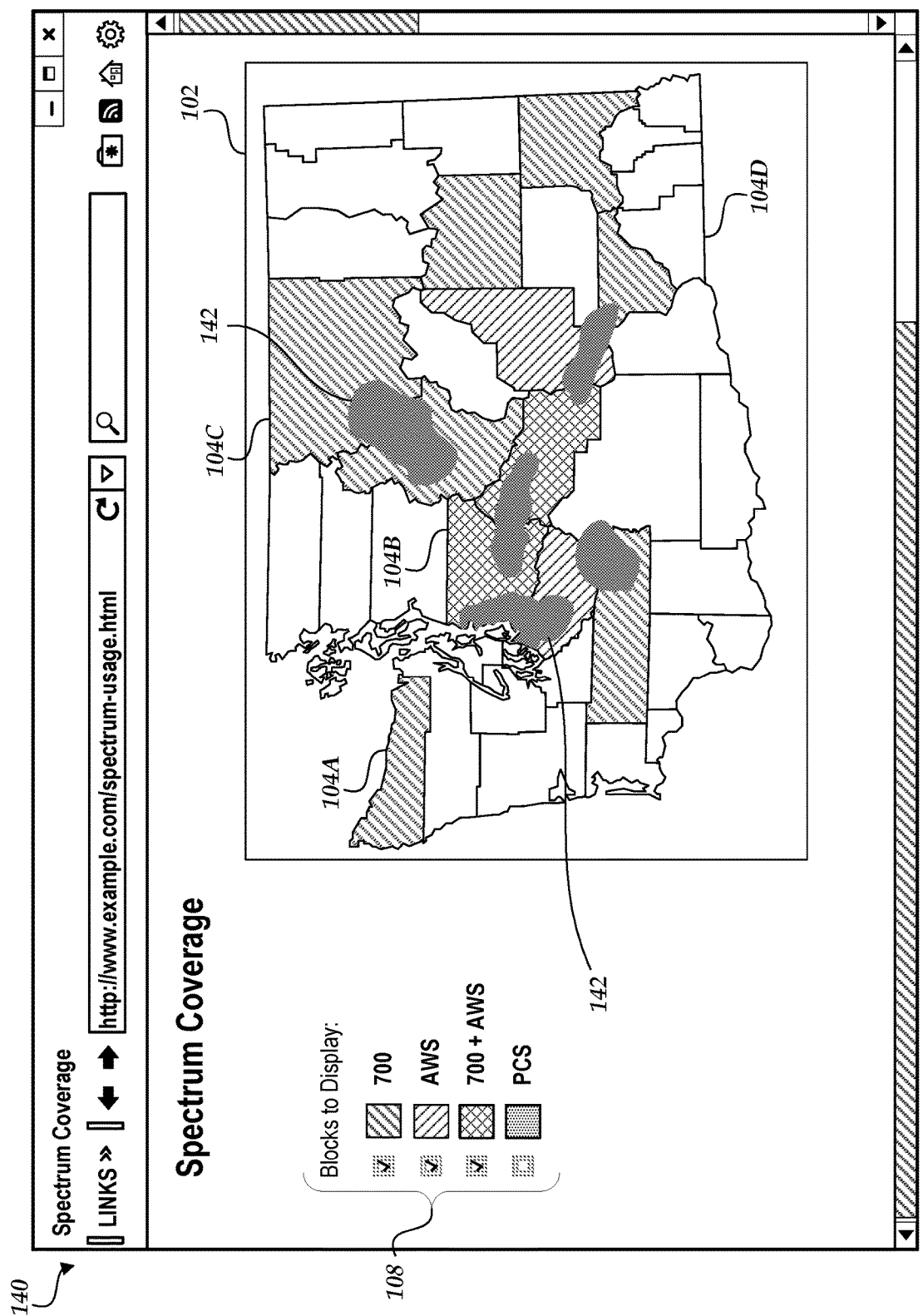

FIG. 1C is a pictorial diagram of an illustrative user interface 140 for displaying network coverage areas relative to spectrum licenses in accordance with aspects of the present disclosure. In the user interface 140, the map display 102 further displays coverage areas 142, indicating the geographic areas where the wireless service provider uses the indicated frequencies to provide wireless services. One skilled in the art will understand that the coverage areas 142 represent areas where wireless signals may be transmitted and received at sufficient strength to enable delivery of wireless services, and that the wireless signals may travel further than the indicated coverage areas 142 at an attenuated level that does not enable delivery of wireless services. One skilled in the art will further understand that the coverage areas 142 may include, for example, estimates based on computer models, empirical measurements, and the like. In some embodiments, the user interface 140 may display different coverage areas 142 for different spectrum blocks. For example, wireless transmissions at a higher frequency may travel shorter distances than a transmissions on a lower-frequency band, and may therefore result in a smaller coverage area 142.

In various embodiments, the user interface 140 may identify coverage areas 142 on a per-cell basis, a per-sector basis, or an aggregate basis, and may display further information regarding cells and sectors. In further embodiments, the user interface 140 may identify coverage areas 142 on the basis of a wireless technology or protocol (e.g., HSPA+ or LTE coverage areas). In still further embodiments, the user interface 140 may include overlays of population, subscribers, or other information.

Figure 1D:
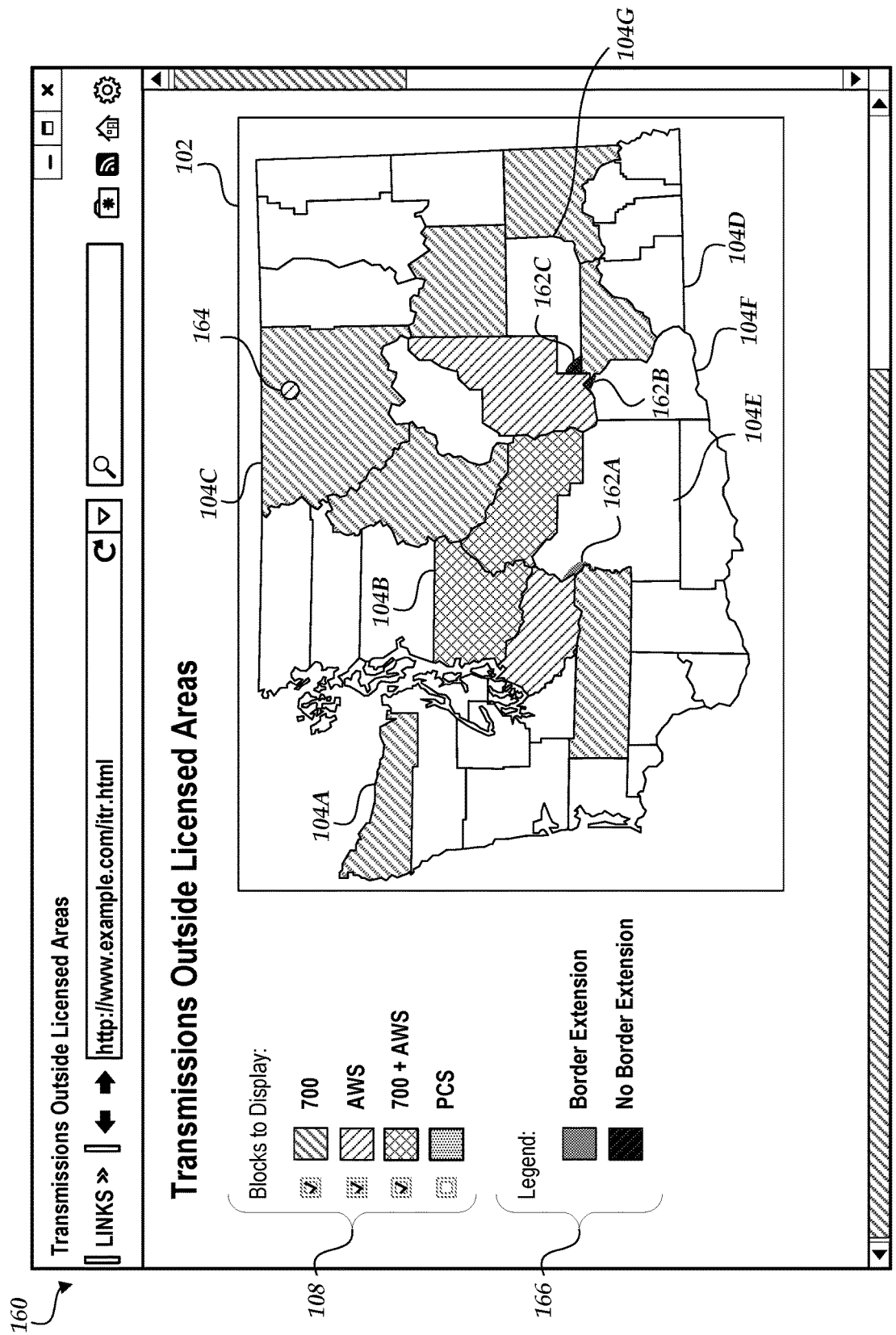

FIG. 1D is a pictorial diagram of an illustrative user interface 160 for displaying wireless transmissions that extend beyond the regions and spectrum bands where the wireless service provider has a license to transmit. In the illustrated user interface 160, the map display 102 further displays unlicensed areas 162A-C, which may correspond to portions of the coverage areas 142 that overlap geographic regions 104E-G in which the wireless service provider holds a license to broadcast on the indicated spectrum band(s). In some embodiments, the map display 102 may further indicate whether the wireless service provider has a border extension agreement with, for example, a license-holder for the geographic region 104E. A border extension agreement may illustratively give the wireless service provider permission to use the spectrum in the otherwise unlicensed area 162A. In further embodiments (not shown in FIG. 1D), the map display 102 may display border extension agreements in which the wireless service provider grants permission to use licensed spectrum to a third party. In further embodiments, the user interface 160 may include a legend 166 that indicates whether an unlicensed area 162A-C is covered by a border extension agreement. The map display 102 further includes a misconfigured cell site 164, which is transmitting on an AWS band in a region where the carrier does not have a license to use that band. In some embodiments, the map display 102 may display misconfigured sectors on a per-sector basis.

In some embodiments, the spectrum management service may generate reports, alerts, notifications, or other messages regarding unlicensed areas 162A-C. For example the spectrum management service may notify engineers responsible for maintaining the wireless network that a portion of the network they maintain is transmitting into an unlicensed area, transmitting on the wrong frequency with respect to spectrum licenses, or provide other information.

Figure 1E:
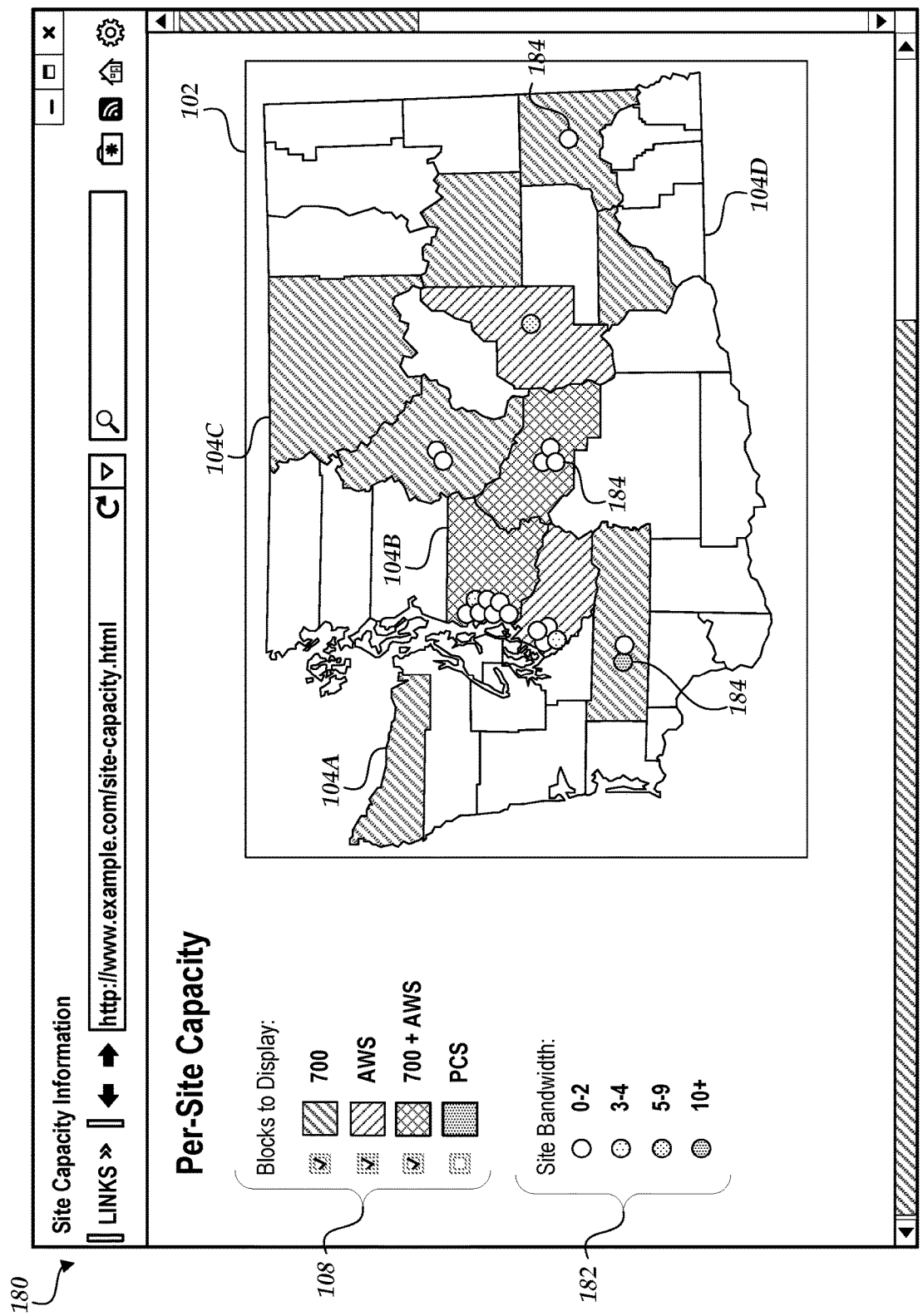

FIG. 1E is a pictorial diagram of an illustrative user interface 180 for displaying wireless network capacity information relative to licensed spectrum. In the illustrated user interface 180, the map display 102 further displays individual cell site capacities 184, indicating the capacity of the cell site to transmit in the indicated spectrum band(s). Cell site capacities 184 may be shaded, colored, or otherwise marked to indicate the amount of capacity, which may be expressed in terms of, for example, available hardware for transmitting wireless signals in the indicated band(s), a number of subscribers who can simultaneously be served by the cell site, a bandwidth, or other measurements of capacity. In some embodiments, capacity may be displayed on a per-sector basis rather than a per-cell basis. In other embodiments, capacity information may be displayed in conjunction with coverage data, usage data, subscriber data, population data, or other information, which may be displayed as overlays on the map display 102 or separately (e.g., as a table or pop-up window).

The user interface 180 may further include a bandwidth legend 182. In some embodiments, the bandwidth legend 182 may enable selection and filtering of the information displayed in the map display 102. For example, the bandwidth legend 182 may enable display of only those cell sites that have a high bandwidth, a low bandwidth, or bandwidth that falls within a particular range.

Figure 1F:
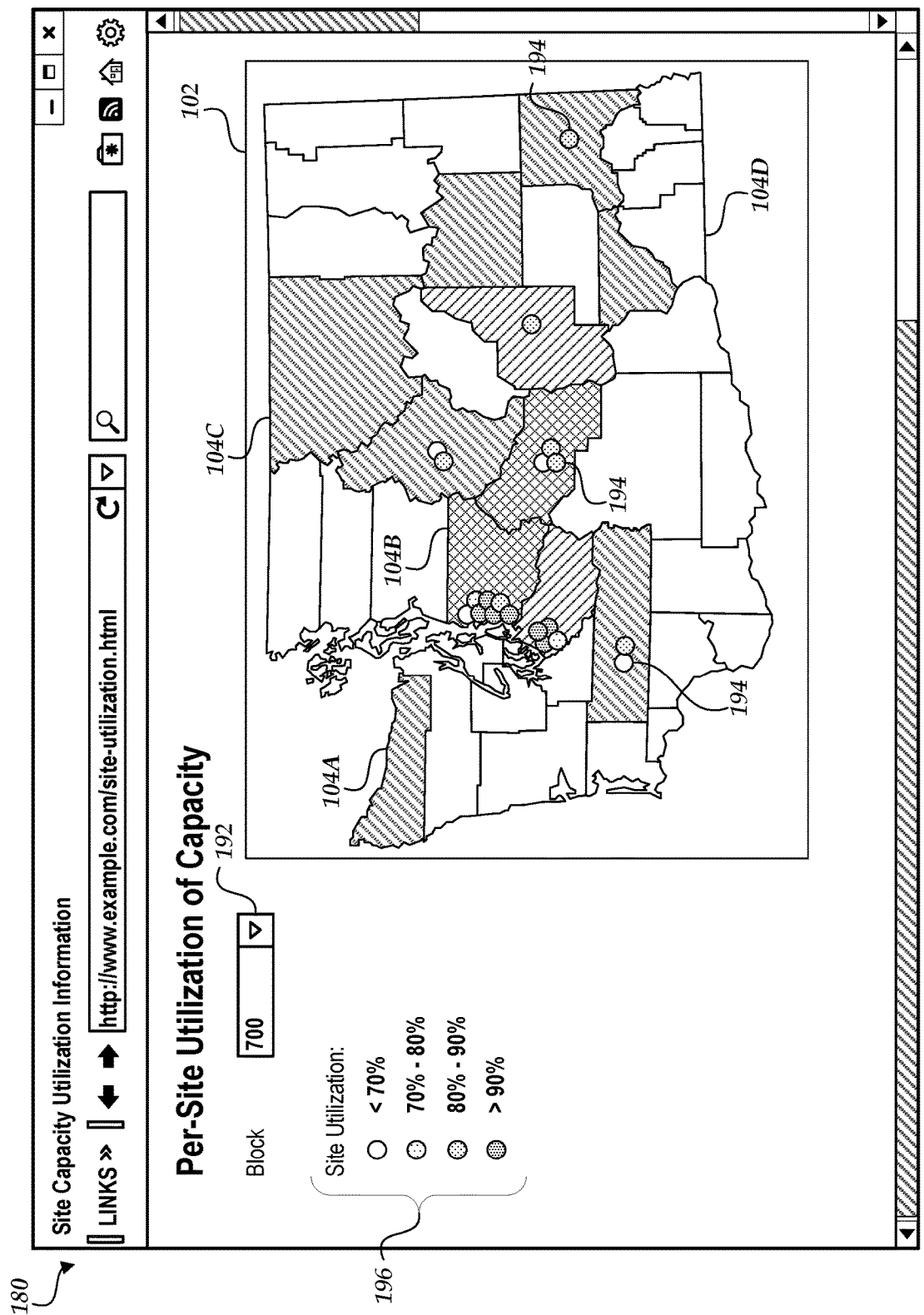

FIG. 1F is a pictorial diagram of an illustrative user interface 190 for displaying wireless network utilization information relative to wireless network capacity or spectrum bandwidth. In the illustrated user interface 190, the map display 102 further displays individual cell site utilizations 194, each of which indicates a cell site's utilization relative to its capacity for a spectrum band that is selected by a band selector 192. The user interface 190 further displays a legend 196, which indicates the degree of utilization displayed. In various embodiments, the user interface 190 may display utilization as a percentage of cell site capacity, a percentage of spectrum bandwidth, as individual amounts of bandwidth utilized by the respective cell sites, or as other values that signify an amount or degree of utilization. In some embodiments, the user interface 190 may display capacities on a per-sector basis, and may display capacity in conjunction with coverage data, usage data, subscriber data, population data, and the like.

In some embodiments, user interfaces that display cell sites (such as user interfaces 160, 180, and 190 of FIGS. 1D-1F) may display additional information when a user selects one of the cell sites. For example, the user interface 180 may display information regarding a cell's physical configuration, such as the orientation of site antennas, the number cell site radios, physical layout (e.g., floor plans or blueprints), backhaul connections, more detailed site utilization data, or may display like information for one or more sectors of the cell. In further embodiments, the information displayed when a cell site is selected may relate to other content of the user interface. For example, map display 102 may, in response to selection of a misconfigured cell site 164, display information regarding the spectrum band that the cell site 164 is improperly using, the license holder of that band, one or more bands that the cell site 164 could be configured to use, contact information for an engineer or team responsible for the cell site 164, and so forth.

It will be understood that various combinations and variations on the illustrated user interfaces are within the scope of the present disclosure. For example, the user interface 180 may be modified to display capacity vs. usage for each cell site 184, and to identify cell sites that have spare capacity or a shortage of capacity. As further examples, the map display 102 may indicate areas where further growth is constrained by lack of available spectrum rather than lack of equipment, or where a particular type of spectrum is needed (e.g., high-frequency spectrum) to provide coverage for particular wireless services (e.g., streaming video). Still further, the spectrum management service may provide user interfaces that identify underused spectrum licenses, as described above.

Figure 2:
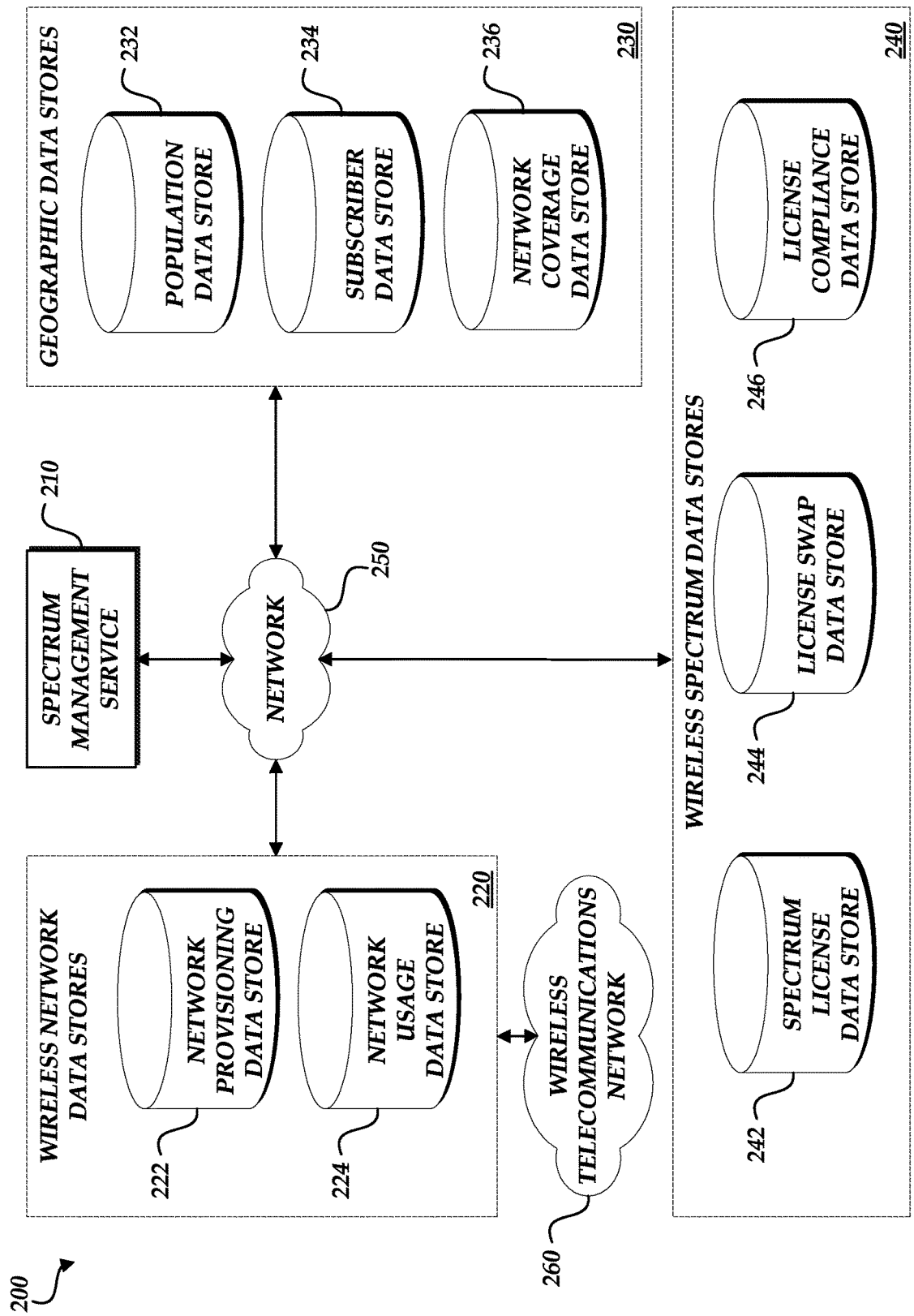
FIG. 2 is an illustrative functional block diagram of an exemplary network environment for implementing a spectrum management service in accordance with aspects of the present disclosure.

FIG. 2 is an illustrative functional block diagram of an exemplary network environment 200 for implementing a spectrum management service in accordance with aspects of the present disclosure. It will be understood that the network environment 200 may include more (or fewer) components than those depicted in FIG. 2, and that illustration of the additional components are not necessary to provide an enabling disclosure. The illustrated network environment 200 includes a spectrum management service 210, which is described in more detail below with reference to FIG. 4. The spectrum management service 210 may communicate with one or more wireless network data stores 220, geographic data stores 230, and/or wireless spectrum data stores 240 via a network 250.

The wireless network data stores 220 may illustratively communicate with a wireless telecommunications network 260, which may include cell sites, trunk lines, switching machines, network gateways, mobile computing devices, and other hardware and software components for providing wireless telecommunications services. In some embodiments, the wireless network data stores 220 may be components of the wireless telecommunications network 260. The wireless telecommunications network 260 may broadcast signals on various bands of the wireless spectrum, and may implement protocols such as LTE, GPRS, CDMA, GSM, or other wireless protocols in order to provide wireless services. The wireless network data stores 220 may include, for example, a network provisioning data store 222, which may store information regarding the capacity of a wireless telecommunications network to utilize various bands of the wireless spectrum. The network provisioning data store 222 may illustratively store data regarding the physical infrastructure (e.g., the hardware and software configurations of individual cell sites or sectors) of the wireless telecommunications network 260.

The wireless network data stores 220 may further include a network usage data store 224, which may store information regarding usage of the wireless telecommunications network 260. Illustratively, the network usage data store 224 may aggregate and store data regarding peak usage, average usage, average usage at peak times, and so forth, and may store data on a per-cell, per-sector, and/or per-band basis. In some embodiments, the network usage data store 224 may store usage data according to categories of usage (e.g., voice, data, video, etc.) and associated spectrum bands.

The spectrum management service 210 may communicate with the wireless network data stores 220 via a network 250. Illustratively, the network 250 may be any wired or wireless network, including but not limited to a local area network (LAN), wide area network (WAN), mesh network, cellular telecommunications network, the Internet, or any other public or private communications network or networks.

The spectrum management service 210 may further communicate with geographic data stores 230 via the network 250. The geographic data stores 230 may illustratively include a population data store 232, which may store census data, population density data, demographic information, and other information regarding the population of various regions associated with the wireless telecommunications network 260. The geographic data stores 230 may further include a subscriber data store 234, which may store information regarding subscribers to wireless services that are provided using the wireless telecommunications network 260. Subscriber information may illustratively include geographic locations associated with individual subscribers, as well as information regarding computing devices and particular services utilized by the subscribers.

The geographic data stores 230 may still further include a network coverage data store 236, which may store information regarding the actual, projected, or intended geographic areas that are covered by the wireless telecommunications network 260. The network coverage data store may illustratively store coverage "footprints" on a per-cell or per-sector basis, and in some embodiments may further store coverage data on a per-band basis.

The spectrum management service may further communicate with wireless spectrum data stores 240 via the network 250. The wireless spectrum data stores 240 may illustratively include a spectrum license data store 242, which may store information regarding spectrum licenses held by the wireless service provider and other parties. The information regarding each spectrum license may illustratively include one or more bands, a current licensee, and a geographic region. In some embodiments, the spectrum license data store 242 may further store information regarding potential future licenses, such as licenses that a government entity may offer for sale at auction.

The wireless spectrum data stores 240 may further include a license swap data store 244, which may store information regarding proposed or planned changes in license ownership. For example, the license swap data store 244 may identify one or more licenses that may change hands, the current licensee, the future licensee, and an effective date of the transfer (if known). In some embodiments, the license swap data store 244 may be combined with the spectrum license data store 242, which may store a date of transfer and future licensee for licenses that are expected to change hands.

The wireless spectrum data stores 240 may further include a license compliance data store 246, which may store information regarding geographic areas in which a wireless service provider is not in compliance with a license (e.g., because the provider's transmissions on a particular band travel outside the boundaries of a licensed region). Illustratively, the spectrum management service 210 may identify such geographic areas and may populate the license compliance data store 246. The license compliance data store 246 may store information including, for example, the geographic area, the spectrum band, and the holder of the spectrum license that corresponds to the area and the band.

It will be understood that the data stores depicted in FIG. 2 are for purposes of example, and may be combined, separated, or grouped in a variety of ways within the scope of the present disclosure. For example, the network usage data store 224 may be omitted, and the spectrum management service 210 may obtain usage data directly from the wireless telecommunications network 260. As a further example, the license compliance data store 246 may be omitted and the spectrum management service 210 may identify and/or report non-compliant transmissions without storing information in a data store. Still further, the spectrum management service 210 may communicate with any number of systems, services, or platforms to obtain information directly rather than retrieving information from data stores.

It will further be understood that the spectrum management service 210 may collect, process, make determinations, and generate user interfaces that relate spectrum licenses to any subset of the information described herein.

Figure 3:
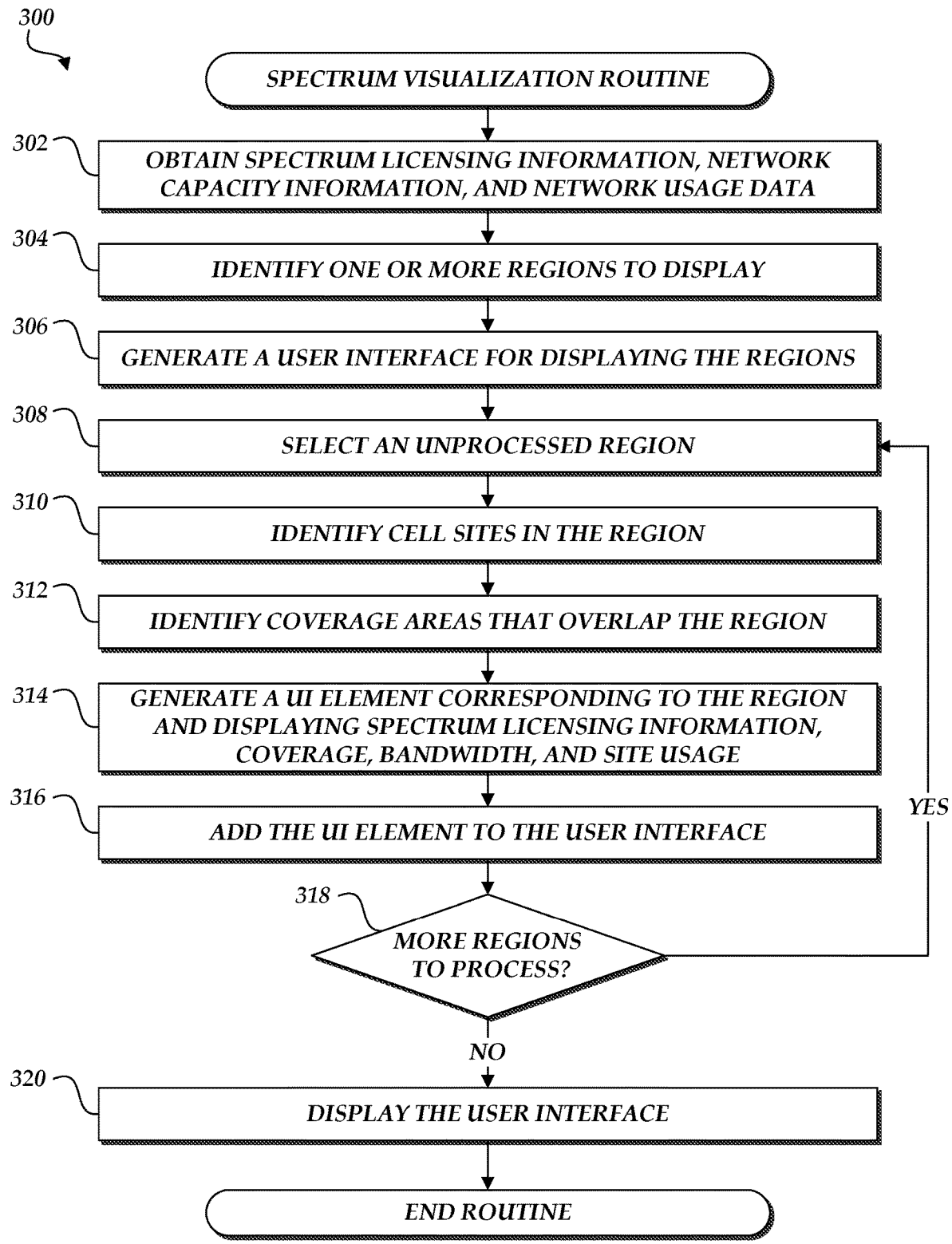
FIG. 3 is a flow diagram depicting an exemplary spectrum visualization routine that may be implemented by a spectrum management services to generate the user interfaces depicted in FIGS. 1A-1E.

FIG. 3 is a flow diagram depicting an example spectrum visualization routine 300. The routine 300 may be carried out, for example, by the spectrum management service 210 of FIG. 2. At block 302, spectrum licensing information, network capacity information, and network usage data may be obtained. Illustratively, spectrum licensing information may be obtained with regard to geographic regions, while capacity and usage information may be obtained on a per-cell or per-sector basis. In various embodiments, subscriber data, population data, license swap information, or other data as described above may be obtained in addition to, or instead of, network capacity information and network usage data.

At block 304, one or more regions to display may be identified. Illustratively, the regions to display may be identified based on a request from a user of the spectrum management service 210, or may by identified based on the data obtained at block 302. At block 306, a user interface may be generated for displaying the regions. Thereafter, at block 308, an unprocessed region may be selected.

At block 310, cell sites corresponding to the region may be identified. Illustratively, the network capacity information or other information regarding the wireless network infrastructure may contain location information (e.g. latitude/longitude coordinates) for individual cell sites of the wireless network. The cell sites whose locations are within the region being processed may thus be identified.

At block 312, coverage areas that overlap the region may be identified. Illustratively, the coverage areas may correspond to individual cell sites or sectors, and the coverage areas identified at block 312 may include areas corresponding to the cell sites identified at block 310 as well as cell sites outside the region that broadcast wireless signals into the region. In some embodiments, only coverage areas that correspond to a particular band or bands may be identified at block 312. In other embodiments, any sites within a geographic distance of the region may be identified, regardless of whether their coverage areas overlap the region.

At block 314, a user interface element may be generated that corresponds to the region and that displays information regarding one or more spectrum licenses associated with the region, the cell sites in the region (and, in some embodiments, near the region), the coverage areas that overlap the region, and in some embodiments capacity data, usage data, population data, subscriber data, or any combination thereof. At block 316, the user interface element may be added to the user interface. Illustratively, as described above, the user interface may include a map display, and the user interface element may correspond to a region of the map.

At decision block 318, a determination may be made as to whether any of the regions identified at block 304 have yet to be processed. If an unprocessed region is found, then the routine 300 branches to block 308, where the unprocessed region may be selected, and the routine 300 then iterates through blocks 310-318 until all regions have been processed. Once all regions have been processed, the routine 300 branches to block 320, where the generated user interface may be displayed.

In some embodiments, the identification of coverage areas that overlap the region in block 312 may by followed by a determination of whether the identified overlap represents an unlicensed use of spectrum in the region. If so, a separate user interface element may be generated that corresponds to the overlapping area, or the unlicensed use of spectrum may be subjected to further processing or action, such as generating a notification or alert. In other embodiments, user interface elements may be generated for individual cell sites or sectors, their respective coverage areas, border extension agreements, or other information obtained at block 302.

The blocks of routine 300 may, in various embodiments, be combined, omitted, or reordered within the scope of the present disclosure. For example, the identification of regions to display at block 304 may precede obtaining any data, and the data obtained may be specific to the region or surrounding regions. As a further example, individual user interface elements may be generated prior to the user interface, and the user interface may be generated initially with the user interface elements included. Still further, the user interface may be displayed and then populated with user interface elements that are generated after the fact.

In some embodiments, the user interface generated by routine 300 may be interactive. For example, the routine 300 may, at block 304, identify regions to display by receiving user input, and may process user input iteratively to select or de-select particular regions, display additional or different information regarding a displayed region, filter the displayed regions according to various criteria, or receive and process user input regarding a region. As further examples, the routine 300 may enable selection, filtering, display of more detailed information, and the like with regard to individual cells or sectors, or may enable the user to select a particular technology, band, or other criterion.

Figure 4:
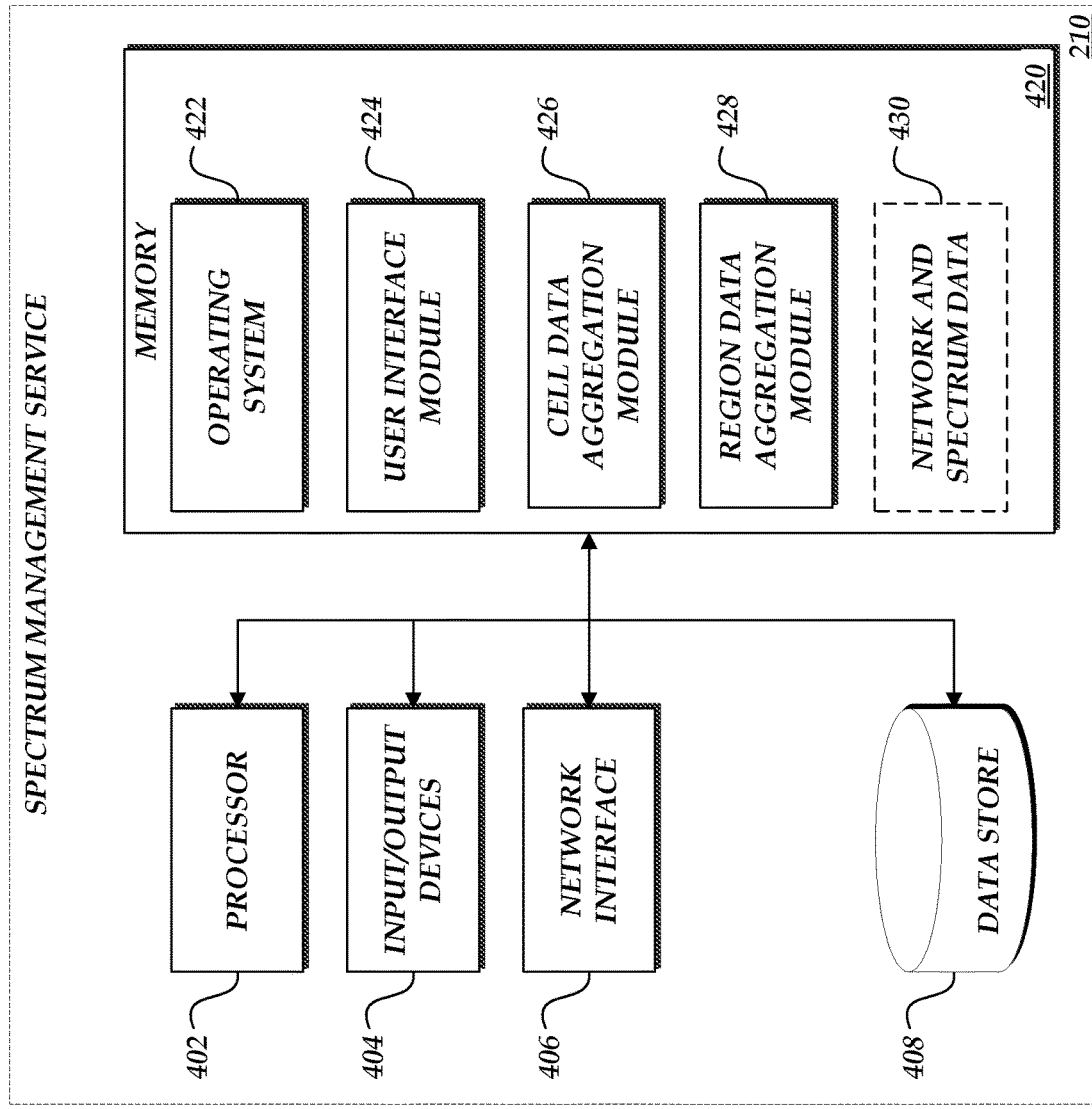
FIG. 4 is an illustrative functional block diagram of a computing device that implements a spectrum management service in accordance with aspects of the present disclosure.

FIG. 4 is an illustrative block diagram depicting a general architecture of a spectrum management service 210, which includes an arrangement of computer hardware and software that may be used to implement aspects of the present disclosure. The spectrum management service 210 may include more (or fewer) elements than those displayed in FIG. 4. It is not necessary, however, that all of these elements be shown in order to provide an enabling disclosure.

As illustrated, the spectrum management service 210 includes a processor 402, input/output devices 404, a network interface 406, and a data store 408, all of which may communicate with one another by way of a communication bus. The network interface 406 may provide connectivity to one or more networks (such as the network 250 of FIG. 2) or computing systems and, as a result, may enable the spectrum management service 210 to receive and send information and instructions from and to other computing systems or services.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the spectrum management service 210. The memory 420 may further store specific computer-executable instructions and other information (which may be referred to herein as "modules") for implementing aspects of the present disclosure.

In some embodiments, the memory 420 may include a user interface module 424, which may be executed by the processor 402 to perform various operations, such as generating user interfaces described with reference to FIGS. 1A-E above. The memory 420 may further include a cell data aggregation module 426, which may collect and aggregate data (e.g., capacity or usage data) on a per-cell or per-sector basis, and may store such data in the data store 408. The memory 420 may still further include a region data aggregation module 428, which may similarly collect, aggregate, and store data (e.g., spectrum license data) on a per-region basis. In some embodiments, the region data aggregation module 428 may aggregate data pertaining to individual cells and sectors within a particular region. The memory 420 may still further include network and spectrum data 430 that are collected via the network interface (or, in some embodiments, obtained from the data store 408) and loaded into the memory 420 as various operations are performed.

While the operating system 422, the user interface module 424, the cell data aggregation module 426, and the region data aggregation module 428 are illustrated as distinct modules in the memory 420, in some embodiments, the cell data aggregation module 426 and the region data aggregation module 428 may be incorporated as modules in the operating system 422 or another application or module, and as such, separate modules may not be required to implement some embodiments. In some embodiments, the cell data aggregation module 426 and the region data aggregation module 428 may be implemented as parts of a single application.

It will be recognized that many of the components described in FIG. 4 are optional and that embodiments of the spectrum management service 210 may or may not combine components. Furthermore, components need not be distinct or discrete. Components may also be reorganized. For example, the spectrum management service 210 may be represented in a single physical device or, alternatively, may be split into multiple physical devices. In some embodiments, components illustrated as part of the spectrum management service 210 may additionally or alternatively be included in other computing devices, such that some aspects of the present disclosure may be performed by the spectrum management service 210 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising:
   a data store configured to store computer-executable instructions; and
   a processor in communication with the data store, wherein the computer-executable instructions, when executed by the processor, configure the processor to:
   obtain spectrum licensing information regarding one or more spectrum licenses associated with a plurality of geographic regions and a plurality of service providers, each of the one or more spectrum licenses identifying:
      a wireless service provider of the plurality of service providers;
      a geographic region of the plurality of geographic regions; and
      one or more spectrum bands;
   obtain, for each of the plurality of geographic regions, wireless network capacity data for a first wireless service provider of the plurality of service providers, the wireless network capacity data identifying:
      a set of cell sites associated with the first wireless service provider and the geographic region; and
      for each cell site in the set of cell sites, a capacity of the cell site to utilize the one or more spectrum bands;
   obtain, for each cell site in the set of cell sites, wireless network utilization data indicating a utilization of the one or more spectrum bands;
   obtain, for each of the plurality of geographic regions, population data regarding a population of the geographic region;
   generate a graphical user interface for displaying the spectrum licensing information, the wireless network capacity data, the wireless network utilization data, and the population data relative to each other;
   obtain wireless network coverage data identifying a geographic coverage area of each of the set of cell sites;
   determine, for at least one region of the plurality of geographic regions, an overlapping coverage region;
   determine whether the overlapping coverage region corresponds to unauthorized use of licensed spectrum in the at least one region;
   generate a user interface element corresponding to the overlapping geographic coverage region responsive to the determination that the overlapping coverage region corresponds to the unauthorized use of the licensed spectrum; and
   cause display of the graphical user interface with the user interface element.

2. The system of claim 1, wherein the processor is further configured to store at least one of the spectrum licensing information, the wireless network capacity data, the wireless network utilization data, or the population data in the data store.

3. The system of claim 1, wherein the processor is further configured to obtain subscriber data regarding a subset of the population of each of the plurality of geographic regions, wherein the subset of the population subscribes to a service provided by the first wireless service provider.

4. The system of claim 1, wherein the graphical user interface comprises a map display of the geographic regions.

5. The system of claim 1, wherein the graphical user interface further displays the wireless network coverage data.

6. The system of claim 1, wherein the processor is further configured to generate a notification or alert responsive to the determination that the overlapping coverage region corresponds to the unauthorized use of licensed spectrum.

7. A computer-implemented method comprising:
   under control of a computing device executing specific computer-executable instructions, obtaining spectrum licensing information regarding one or more spectrum licenses, each of the one or more spectrum licenses identifying a wireless service provider of a plurality of wireless service providers, a geographic region, and one or more spectrum bands;
   obtaining wireless network capacity data corresponding to a first wireless service provider of the plurality of wireless service providers and the spectrum licensing information;
   obtaining wireless network utilization data corresponding to the first wireless service provider and the spectrum licensing information;
   generating a graphical user interface for displaying the spectrum licensing information, the wireless network capacity data, and the wireless network utilization data relative to each other;
   obtaining wireless network coverage data associated with the spectrum licensing information;
   identifying, based at least in part on the wireless network coverage data and the spectrum licensing information, an unauthorized use of licensed spectrum, the unauthorized use corresponding to a first geographic area, wherein:
      the wireless network coverage data indicates that the first wireless service provider transmits into the first geographic area on a first spectrum band;
      the first geographic area overlaps a geographic area associated with at least one of the one or more spectrum licenses; and
      none of the one or more spectrum licenses grant the first wireless service provider permission to transmit into the first geographic area on the first spectrum band;
   generating a user interface element corresponding to the first geographic area; and
   displaying the graphical user interface with the user interface element.

8. The computer-implemented method of claim 7 further comprising:
   obtaining information regarding a border extension agreement with a second wireless service provider of the plurality of wireless service providers, the border extension agreement indicating at least one of:

the wireless service provider having permission from the second wireless service provider to transmit into the first geographic area on the first spectrum band; or the second wireless service provider having permission from the wireless service provider to transmit into a second geographic area on a spectrum band; and displaying information regarding the border extension agreement in the graphical user interface.

9. The computer-implemented method of claim 7 further comprising:

identifying a first region where additional spectrum is needed based at least in part on the spectrum licensing information, the wireless network capacity data, and the wireless network utilization data.

10. The computer-implemented method of claim 9 further comprising:

identifying a second region where available spectrum is underutilized based at least in part on the spectrum licensing information, the wireless network capacity data, and the wireless network utilization data.

11. The computer-implemented method of claim 10 further comprising:

determining, based at least in part on the first region and the second region, a recommended spectrum license transaction between the first wireless service provider and a second wireless service provider.

12. The computer-implemented method of claim 7 further comprising:

obtaining information regarding a spectrum license transaction, the spectrum license transaction identifying a first spectrum license to be transferred from a second wireless service provider to the first wireless service provider;

storing the information regarding the spectrum license transaction in a data store;

generating an updated graphical user interface, wherein the updated graphical user interface includes the spectrum license transaction; and displaying the updated graphical user interface.

13. A non-transitory, computer-readable medium containing specific computer-executable instructions that, when executed by a processor, configure the processor to:

obtain spectrum license information identifying a first wireless service provider of a plurality of service providers, one or more geographic regions, and one or more spectrum bands;

obtain wireless network capacity data corresponding to the first wireless service provider and the one or more spectrum bands;

obtain wireless network utilization data corresponding to the first wireless service provider and the spectrum licensing information;

generate a user interface for displaying the wireless network capacity data and the wireless network utilization data relative to the spectrum license information;

obtain wireless network coverage data;

identify, based at least in part on the wireless network coverage data and the spectrum licensing information, an unauthorized use of licensed spectrum, the unauthorized use corresponding to a first geographic area, wherein:

the wireless network coverage data indicates that the first wireless service provider transmits into the first geographic area on a first spectrum band;

the first geographic area overlaps a geographic area associated with a spectrum license; and the spectrum license information does not indicate that the first wireless service provider has permission to transmit into the first geographic area on the first spectrum band;

generate a user interface element corresponding to the first geographic area; and cause display of the user interface with the user interface element.

14. The non-transitory, computer-readable medium of claim 13, wherein the processor is further configured to obtain wireless network utilization data, and wherein the user interface further displays the wireless network utilization data relative to the wireless network capacity data and the spectrum license information.

15. The non-transitory, computer-readable medium of claim 14, wherein the wireless network utilization data specifies utilization on a per-sector basis.

* * * * *